United States Patent [19]

Marron et al.

[11] Patent Number: 5,413,224
[45] Date of Patent: May 9, 1995

[54] STACKABLE PALLET PACKAGING

[75] Inventors: John V. Marron, Lakewood; Gerhard Plamper, Valley City, both of Ohio

[73] Assignee: Ply Mar Inc., Cleveland, Ohio

[21] Appl. No.: 96,776

[22] Filed: Jul. 23, 1993

[51] Int. Cl.[6] .................... B65D 19/00; B65D 85/68
[52] U.S. Cl. .................... 206/600; 206/335; 206/386; 206/511; 220/1.5
[58] Field of Search .............. 206/335, 386, 515, 517, 206/597, 600, 511, 512, 505, 507; 220/1.5, 4.27

[56] References Cited

U.S. PATENT DOCUMENTS

| | | | |
|---|---|---|---|
| 3,361,293 | 1/1968 | Box .................... | 206/511 |
| 3,949,876 | 4/1976 | Bridges et al. .................... | 206/511 X |
| 4,113,118 | 9/1978 | Glumac .................... | 206/386 X |
| 4,171,741 | 10/1979 | Fish . | |
| 4,244,471 | 1/1981 | Plante . | |
| 4,254,873 | 3/1981 | Cook, III et al. .................... | 206/600 X |
| 4,428,487 | 1/1984 | Hepp .................... | 206/511 X |
| 4,480,748 | 11/1984 | Wind .................... | 206/386 |
| 4,483,444 | 11/1984 | Gardner . | |
| 4,580,680 | 4/1986 | Wind .................... | 206/386 |
| 4,643,314 | 2/1987 | Kidd . | |
| 4,762,226 | 8/1988 | Gatton . | |
| 4,804,087 | 2/1989 | Smith . | |
| 4,852,756 | 9/1989 | Holladay . | |
| 5,029,734 | 7/1991 | Nichols . | |
| 5,069,338 | 12/1991 | Grigsby . | |
| 5,143,283 | 9/1992 | Lancaster . | |
| 5,154,286 | 10/1992 | Gits . | |
| 5,174,448 | 12/1992 | Flaig . | |

FOREIGN PATENT DOCUMENTS 612468 10/1960 Italy .................... 206/335

OTHER PUBLICATIONS

Advertising Brochure of Litco International, Inc. for INCA molded wood pallets.
Advertising Brochure of White Consolidated Industries, Inc. for Open Face appliance packaging.

Primary Examiner—Bryon P. Gehman
Attorney, Agent, or Firm—Tarolli, Sundheim & Covell

[57] ABSTRACT

A package for an article such as a garden tractor includes a bottom platform having first and second opposite major side surfaces, the first major side surface for receiving thereon the article. A top platform is substantially identical to the bottom platform and has first and second opposite major side surfaces. A plurality of load-bearing support members support the top platform on the bottom platform at a location spaced upward from the bottom platform when the package is in an assembled condition to at least partially define an article-receiving chamber therebetween. The first major side surface of the top platform faces in the same direction as the first major side surface of the bottom platform when the package is in the assembled condition, so that the top platform can serve as the bottom platform for another article package above. A plurality of connector members releasably interconnect the support members with the top and bottom platforms when the package is in the assembled condition. All parts of the package are recyclable. The package in a disassembled condition is returnable and is then reusable for shipping the same type of product or, when the platform is separated at a score line to form a standard-size pallet, for carrying a different product.

9 Claims, 11 Drawing Sheets

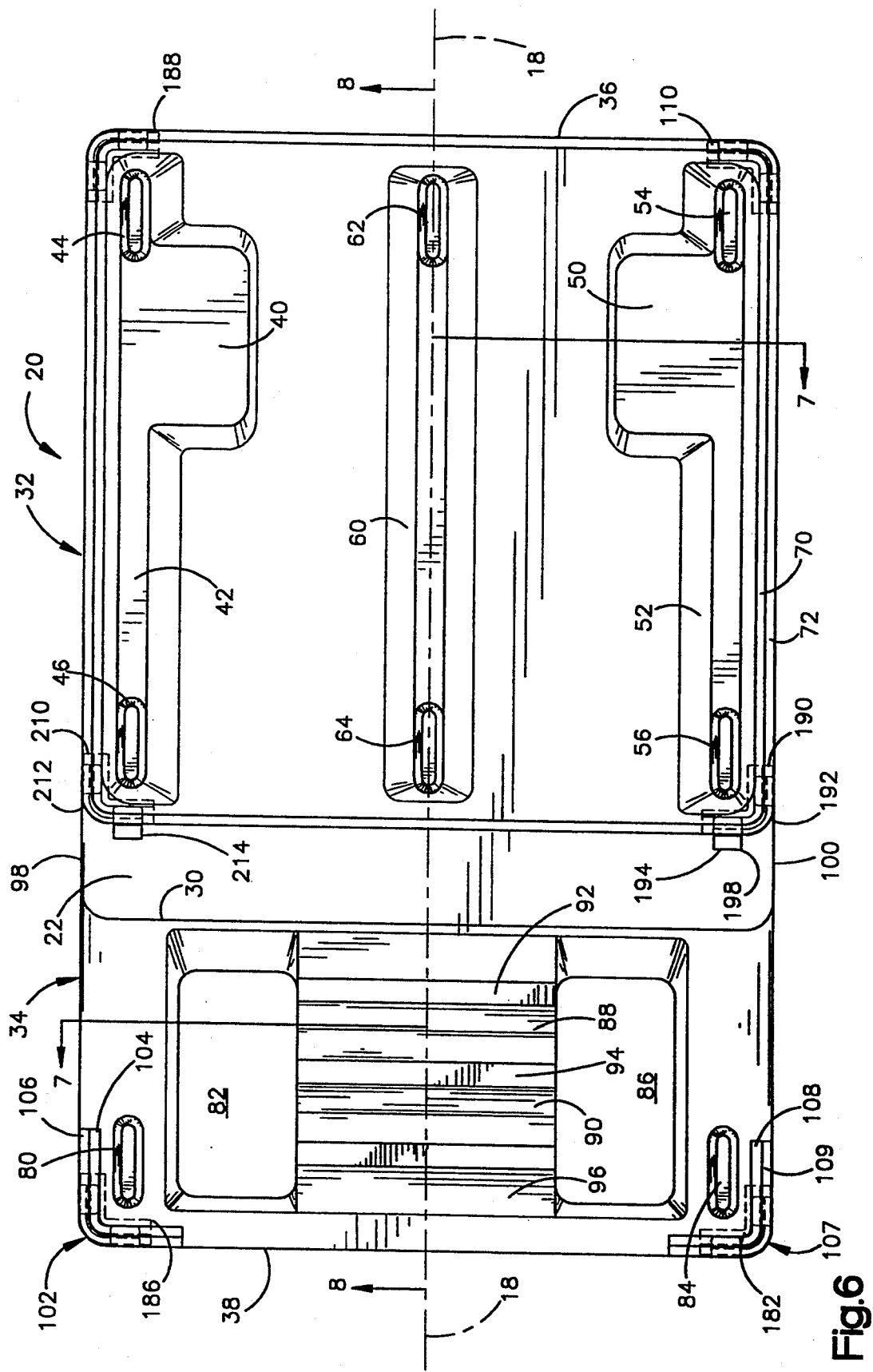

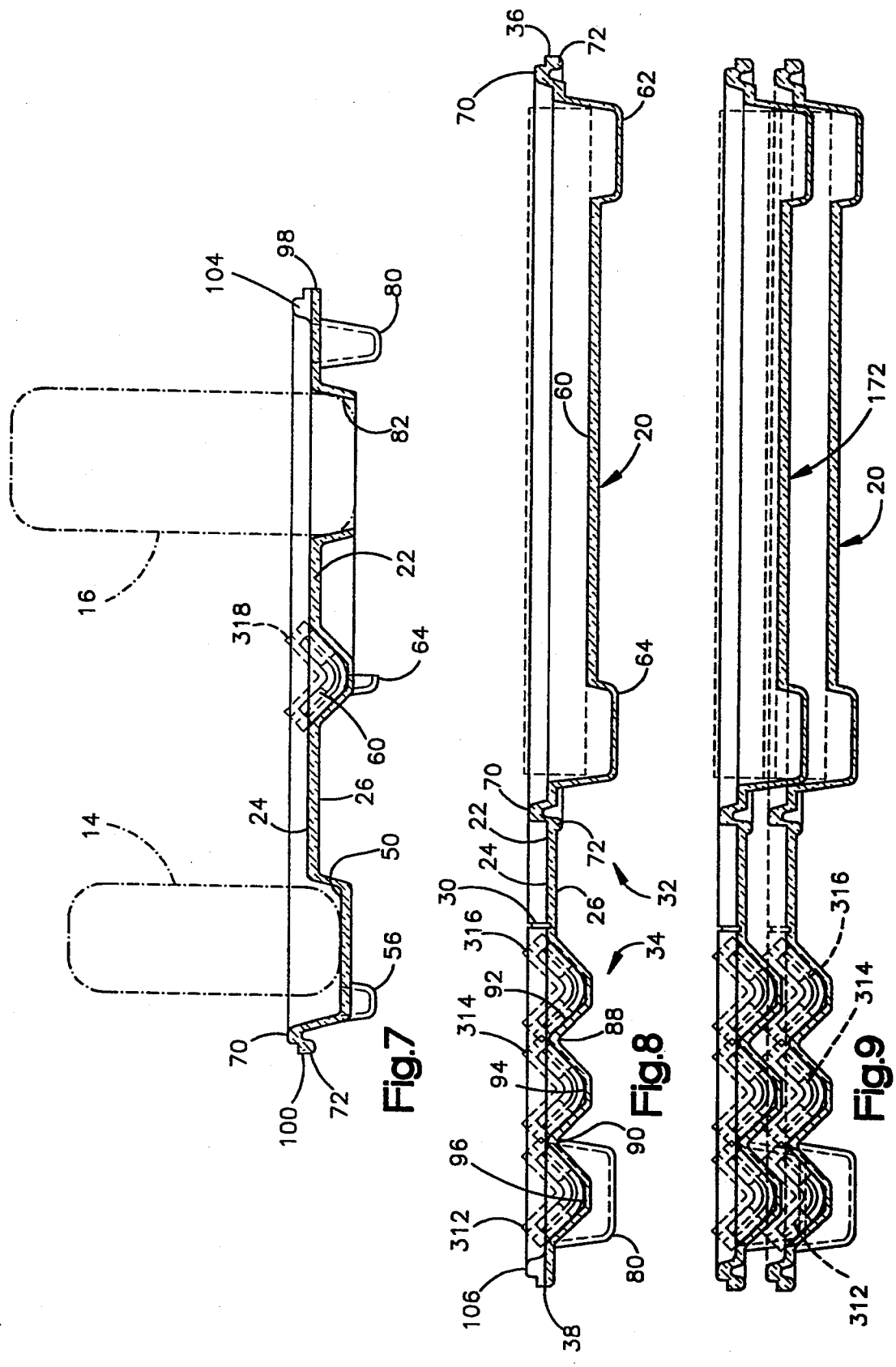

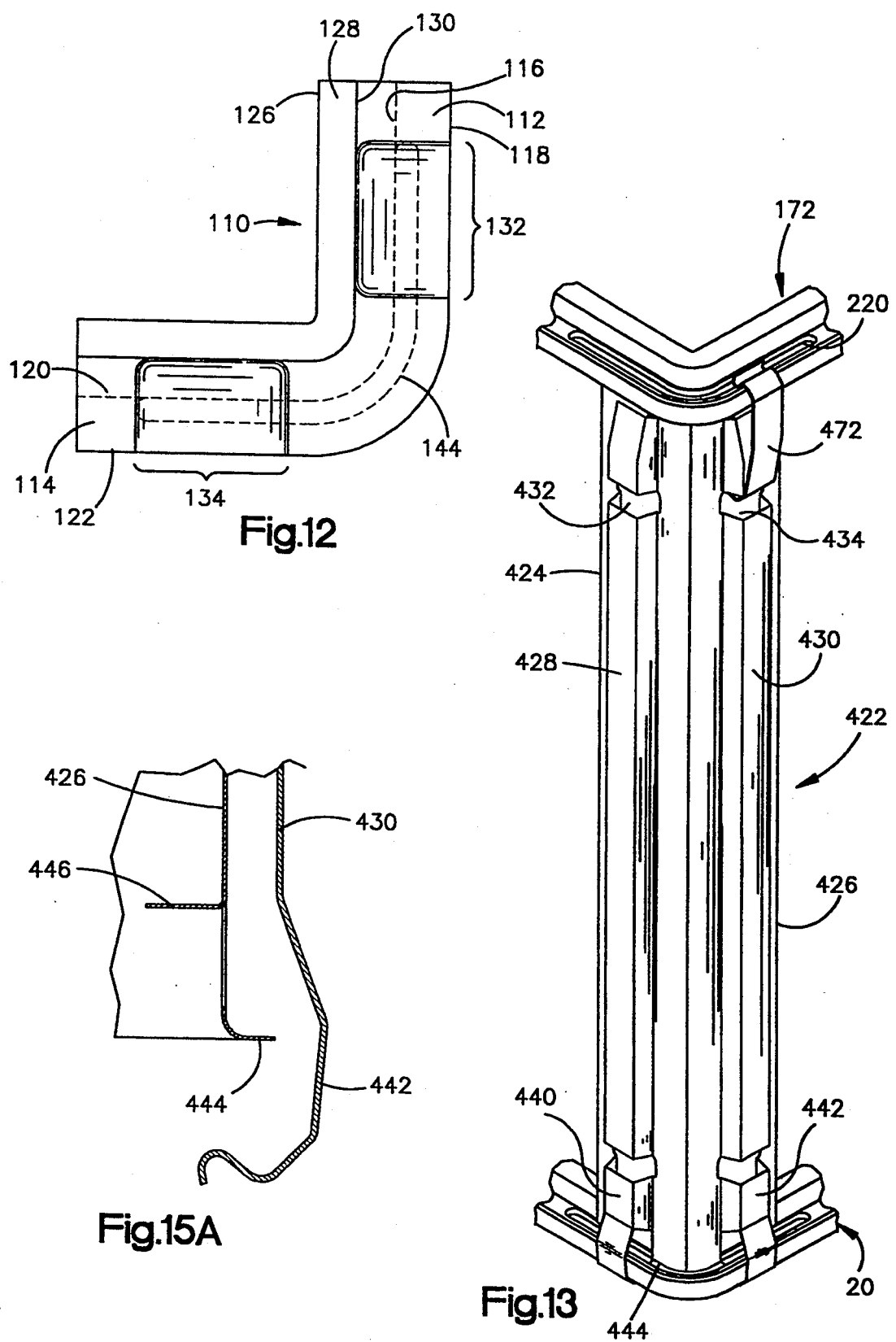

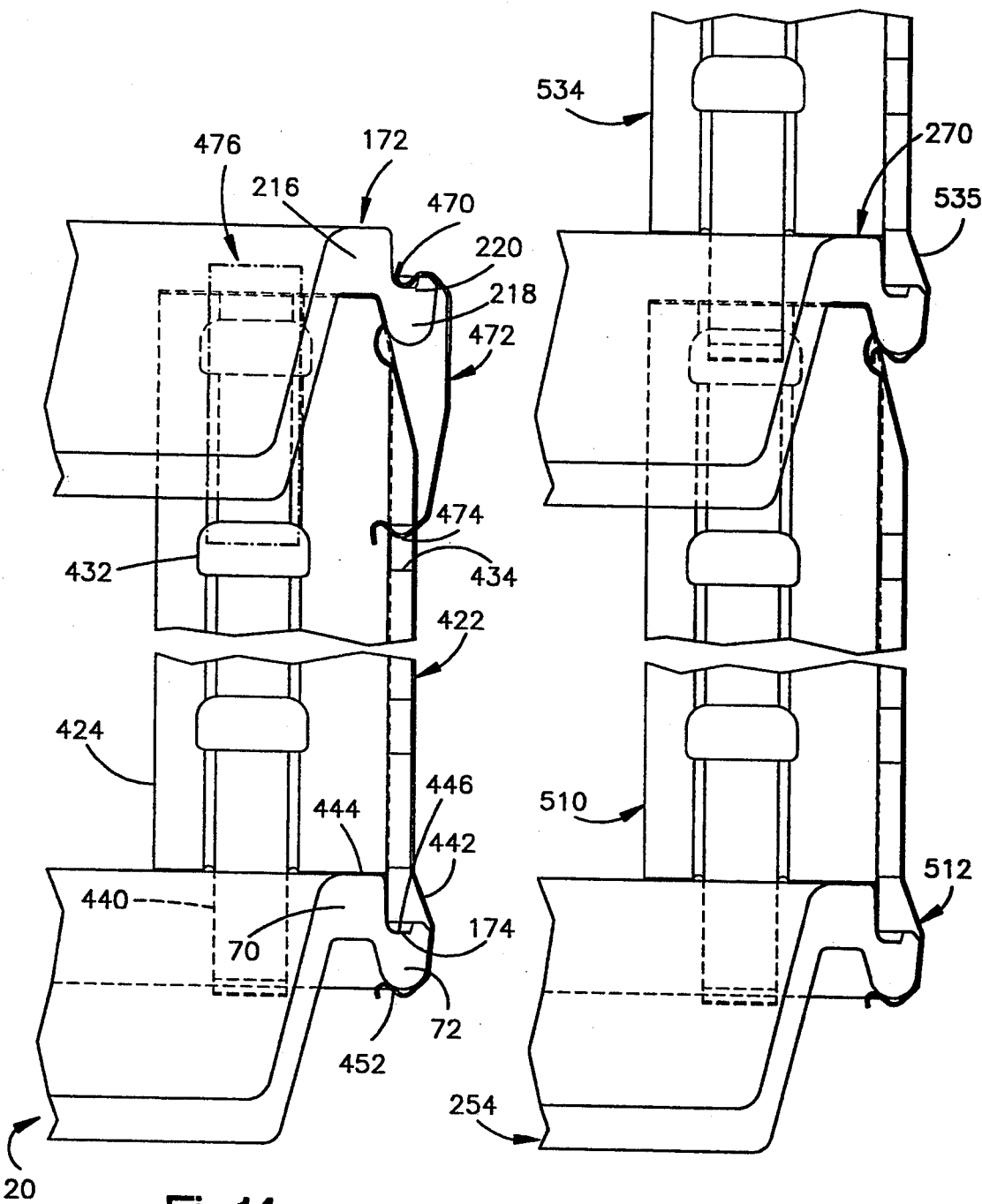

STACKABLE PALLET PACKAGING

BACKGROUND OF THE INVENTION

The present invention relates to a packaging system. More particularly, the present invention relates to stackable, knockdown packages or shipping stands designed for receiving and transporting articles such as lawn and garden tractors.

U.S. Pat. No. 4,804,087 discloses a shipping stand for holding a lawn and garden tractor for shipping or storage. While this type of stand has been found to be useful for holding a tractor for shipping and storage, the molded plastic pallet of this stand has integral metal inserts, and thus cannot be recycled. Further, separate bolts are required to secure its post framework, and no top pallet is provided.

SUMMARY OF THE INVENTION

The present invention is a package for an article such as a garden tractor. The package has a disassembled condition and an assembled condition. The package includes a bottom platform having first and second opposite major side surfaces, the first major side surface for receiving thereon the article. A top platform is substantially identical to the bottom platform and has first and second opposite major side surfaces. A plurality of load-bearing support members support the top platform on the bottom platform at a location spaced upward from the bottom platform when the package is in the assembled condition to at least partially define an article-receiving chamber therebetween. The first major side surface of the top platform faces in the same direction as the first major side surface of the bottom platform when the package is in the assembled condition. A plurality of connector members releasably interconnect the support members with the top and bottom platforms when the package is in the assembled condition.

In a preferred embodiment, all the component parts of the package are recyclable. That is, each component is free of any inserts or attached parts of a different material. Thus, each component can be recycled as by grinding without prior material separation steps. Also, because the top platform is the same as the bottom platform, a second article can be placed on top of the top platform which then serves as the bottom platform for a second package to form a multi-pack unit.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 6 is a top plan view of the pallet of FIG. 5;

FIG. 7 is a transverse sectional view of a pallet of FIG. 6 taken along line 7—7 of FIG. 6;

FIG. 8 is a sectional view of the pallet of FIG. 6 taken along line 8—8 of FIG. 6;

FIG. 9 illustrates the nesting of two pallets;

FIG. 12 is a top plan view of one of the support posts made of molded wood products;

FIG. 13 is a perspective view of a portion of the shipping stand of FIG. 2 showing a steel support post in engagement with the upper and lower pallets;

FIG. 14 is a schematic enlarged view illustrating the engagement between a steel post and the upper and lower pallets of a single pack shipping stand;

FIG. 15 is a view similar to FIG. 14 but for a multi-pack shipping stand;

FIG. 15A is an enlarged sectional view of a portion of a steel support post;

DESCRIPTION OF PREFERRED EMBODIMENTS OF THE INVENTION

The present invention relates to a package for an article, the package having a disassembled condition and an assembled condition. More particularly, the present invention relates to a package or shipping stand for an article such as a garden tractor.

Single Pack—Wood Posts

Figure 1:
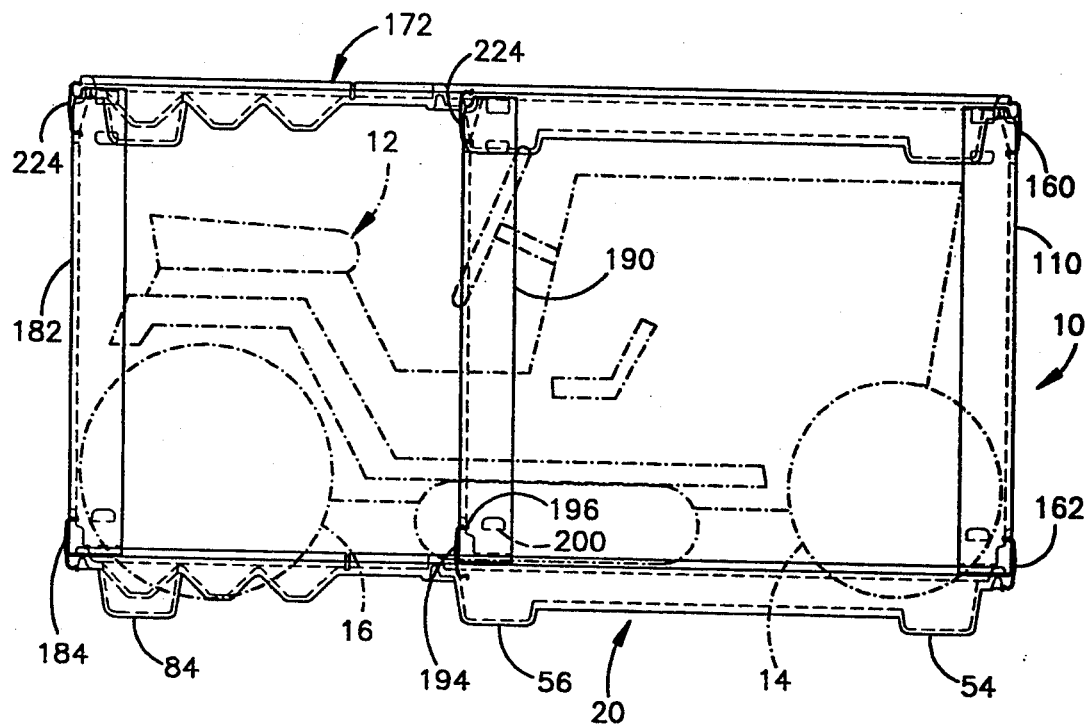
FIG. 1 is a schematic view of a shipping stand in accordance with the present invention for receiving and transporting a garden tractor, including upper and lower pallets and support posts made of molded wood products.

The present invention is applicable to various package constructions. As representative of the present invention, FIG. 1 illustrates a single pack shipping stand 10. The shipping stand 10 is adapted to receive and transport an article such as a garden tractor 12 having front wheels 14 and rear wheels 16. The tractor 12 is disposed front to back in the shipping stand 10 along a front to back or longitudinal axis 18 (FIG. 5) of the shipping stand 10.

The shipping stand 10 includes a generally rectangular lower platform or pallet 20. The lower pallet 20 (FIGS. 5 and 6) has a deck or platform 22 with an upper major side surface 24 and a lower major side surface 26. A score line 30 in the upper major side surface 24 of the lower pallet 20 divides the lower pallet into a front portion 32 and a back portion 34. The pallet front portion 32 extends between the score line 30 and a front side 36 of the pallet 20. The pallet back portion 34 extends between the score line 30 and a back side 38 of the pallet 20.

The front portion 32 of the lower pallet 20 includes a left front wheel well 40. The left front wheel well 40 is integral with a left storage channel 42 extending between a left front foot 44 and a left center foot 46 of the lower pallet 20. The pallet front portion 32 also includes a right front wheel well 50. The right front wheel well 50 is integral with a right storage channel 52 extending between a right front foot 54 and a right center foot 56 of the pallet. The pallet front portion 32 includes a central storage channel 60 extending between a center front foot 62 and a center foot 64 of the pallet 20. The three storage channels 42, 52 and 60 extend parallel to each other and parallel to the axis 18.

At the outer periphery of the front portion 32 of the lower pallet 20 is a circumferentially extending inner rim portion 70 disposed generally above the upper major side surface 24 of the pallet. An outer rim portion 72 extends circumferentially around the inner rim portion 70 below the inner rim portion 70 and generally below the upper major side surface 24 of the pallet 20.

The back portion 34 of the pallet 20 includes a left rear foot 80 adjacent an open left rear wheel well 82. A right rear foot 84 is disposed adjacent an open right rear wheel well 86. Two triangular shaped ribs 88 and 90 extend laterally between the left rear wheel well 82 and the right rear wheel well 86. The ribs 88 and 90 define with the upper major side surface 24 three rear storage channels 92, 94 and 96 extending transversely across the pallet 20 in a direction from the left side 98 of the pallet to the right side 100 of the pallet.

The back portion 34 of the pallet 20 includes a left rear corner rim portion 102 similar in cross-sectional configuration to the inner and outer rim portions 70 and 72 of the pallet front portion 32. The left rear corner rim portion 102 includes an inner rim portion 104 and an outer rim portion 106. The pallet back portion 34 also includes a right rear corner rim portion 107 of the same cross-sectional configuration and including an inner rim portion 108 and an outer rim portion 109 at the outer periphery of the pallet 20.

The pallet 20 is preferably a molded wood product, i.e., a known mixture of wood fibers and synthetic resins.

The shipping stand 10 includes a plurality of identical support posts which, when the package is in the assembled condition as shown in FIG. 1, extend upwardly from the lower pallet 20. Either four or six support posts may be used. As all the support posts are identical, the right front support post 110 will be described as exemplary. The support posts are preferably made of the same molded wood products material as the pallet 20.

The post 110 (FIGS. 1, 10 and 12) is generally L-shaped in cross-sectional configuration as best seen in FIG. 12. The post 110 includes two vertically extending walls 112 and 114 disposed at right angles to each other. The wall 112 has an inner side surface 116 and an outer side surface 118. The wall 114 has an inner side surface 120 and an outer side surface 122.

An L-shaped top portion 124 (FIG. 10) of the post 110 is thicker in cross-sectional configuration than the walls 112 and 114. The top portion 124 has an inner side surface 126 and an upper end surface 128. The exterior of the post top portion 124 is cut away at 130 to form an L-shaped hollowed out portion extending around both walls 112 and 114 of the post for receiving the outer rim portion of a pallet such as the pallet 20. The post top portion 124 is further cut away at two spring cutouts 132 and 134 to receive the lower end portion of a spring clip connector as explained below.

An L-shaped bottom portion 140 of the post 110 is also thicker in cross-sectional configuration than the walls 112 and 114. An L-shaped post lower leg section 142 extends downwardly from the post bottom portion 140. An L-shaped rib 144 on the underside of the post lower leg section 142 extends around and under both walls 112 and 114 of the post 110.

Four spring clip receiving openings extend through the walls 112 and 114 of the post 110. A spring clip receiving opening 150 in the wall 112 is disposed at the same vertical height along the post 110 as a spring clip receiving opening 152 in the wall 114, near the upper end portion of the post 110. Similarly, a spring clip receiving opening 154 in the wall 114 is disposed at the same vertical position along the post 110 as a spring clip receiving opening 156 in the wall 114, near the lower end portion 140 of the post 110.

The shipping stand 10 includes a plurality of identical spring clips for releasably interconnecting, in a manner as described below, the lower pallet 20 and the support posts including the support post 110. All of the spring clips are identical. The spring clips are preferably made of spring steel about one millimeter in thickness. An exemplary spring clip 160 (FIG. 10) includes an upper end portion 164 and a lower end portion 166.

The shipping stand 10 also includes an upper pallet 172 releasably interconnected atop the several support posts, in a manner described below, by a plurality of spring clips identical to the spring clips used to interconnect the lower pallet and the support posts. An exemplary spring clip 162 includes an upper end portion 168 and a lower end portion 170. The upper pallet 172 is identical to the lower pallet 20.

Assembled Condition

To form the shipping stand 10 in the assembled condition as shown in FIG. 1, the lower pallet 20 is placed on the ground or on a similar support. The eight feet 44, 46, 54, 56, 62, 64, 80, and 84 support the platform 22 off the ground. The tractor 12 is positioned on the lower pallet 20. The front wheels 14 of the tractor 12 are disposed in the front wheel wells 40 and 50. The rear wheels 16 of the tractor 12 are disposed in the rear wheel wells 82 and 86.

A plurality of the identical molded wood support ports are then connected with the lower pallet 20 to extend upwardly from the lower pallet 20. At least four support posts are used, at the four outer corners of the pallet 20.

Figure 10:
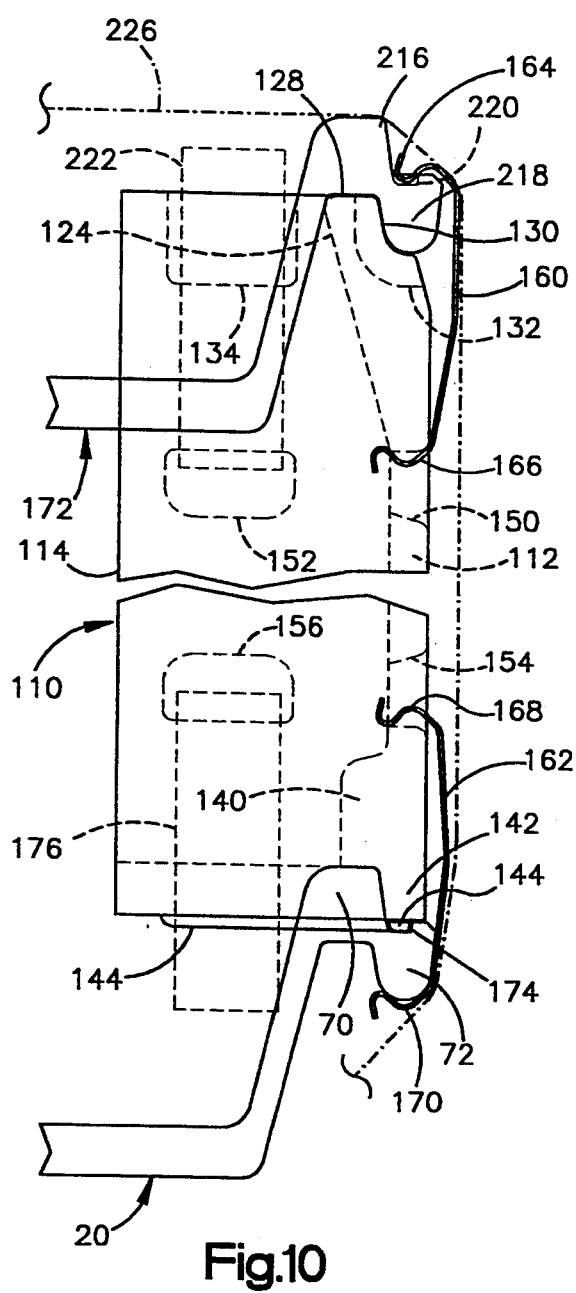
FIG. 10 is a schematic enlarged view of portions of the shipping stand of FIG. 1 showing the engagement between the support posts, the upper and lower pallets, and the spring clip connectors.

The right front support post 110 is positioned on the right front corner of the pallet 20 (FIGS. 1, 6 and 10). The L-shaped bottom portion 140 of the post 110 rests on the L-shaped upper rim portion 70 of the pallet 20. The L-shaped lower leg section 142 of the post 110 rests on the L-shaped outer rim portion 72 of the pallet 20. The L-shaped rib 144 on the bottom of the post 110 is received in a shallow L-shaped channel 174 (FIG. 10) at the top of the pallet outer rim portion 72. The post 110 and the pallet 20 thus interfit or interlock with each other, with the L-shaped cross-sectional configuration of the post blocking movement of the post inwardly of the pallet either axially or transversely.

Two spring clips releasably interconnect the post 110 and the lower pallet 20. The upper end portion 168 of the spring clip 162 engages in the spring clip receiving opening 154 in the wall 112 of the post 110. The lower end portion 170 of the spring clip 162 engages underneath the pallet outer rim portion 72. A second spring clip 176 (shown in phantom in FIG. 10) is connected between the post wall 114 and the lower pallet 20. The upper end portion of the spring clip 176 engages in the spring clip receiving opening 156 (FIG. 10) in the post 110 and its lower end portion engages underneath the lower end portion 72 of the lower pallet 20. Thus, the two metal spring clips are connected between the lower portion of the post 110 and the lower pallet 20, to releasably interconnect the post and the lower pallet.

Support posts identical to the support post 110 are also placed at the three other corners of the lower pallet 20 for connection therewith to extend vertically upward from the lower pallet 20. A right rear support post 182 (FIGS. 1 and 6) extends upwardly from the right rear corner of the lower pallet 20. The right rear support post 182 is releasably connected with the right rear corner rim portion 107 of the pallet 20 by two spring clips in the same manner as the support post 110, including a spring clip 184 (FIG. 1) and a second spring clip (not shown) on the other wall of the L-shaped support post.

Similarly, a third support post 186 (FIG. 6) is positioned on the left rear corner rim portion 102 of the lower pallet 20. Two spring clips (not shown) interconnect the lower portion of the post 186 with the rim portion 104. A fourth support post 188 (FIG. 6) is positioned on the left front corner of the pallet 20. Two spring clips (not shown) interconnect the support post 188 and the lower pallet 20.

If desired, two additional intermediate support posts may be used for additional support and stability. A right intermediate post 190 (FIGS. 1 and 6) may be supported on a right corner portion 192 (FIG. 6) of the circumferentially extending rim of the pallet front portion 32. Two spring clips releasably interconnect the post 190 with the lower pallet 20. One spring clip 194 (FIG. 1) extends through an opening 196 in the post 190 and through an opening 198 (FIGS. 5 and 6) in the platform 22 of the lower pallet 20. A second spring clip (not shown) extends between a second spring clip receiving opening 200 (FIG. 1) in the post 190 and engages underneath the outer rim portion 72.

In a similar manner, a left intermediate post 210 (FIG. 6) may be positioned at a left rear corner 212 of the pallet front portion 32. The post 210 is releasably interconnected with the pallet 20 by two spring clips including one extending through an opening 214 in the platform 22 of the lower pallet 20.

The upper pallet 172 is then connected with the support posts including the support post 110. The upper pallet 172 (FIG. 10) has an upper rim portion 216 which rests on the upper end surface 128 of the post 110. A lower rim portion 218 of the upper pallet 172 rests on the cut away surface 130 of the post 110.

Two spring clips releasably interconnect the upper pallet 172 and the post 110. The upper end portion 164 of the spring clip 160 engages in a shallow channel 220 (the same as the channel 174 of the pallet 20) in the lower rim portion 218. The lower end portion 166 of the spring clip 160 extends through and engages in the spring clip receiving opening 150 at the upper portion of the post 110. A second spring clip shown in phantom at 222 may be used to interconnect the upper pallet 172 with the post 110 through the spring clip receiving opening 152 in the post wall 114 of the support post 110.

Thus, the upper pallet 172 is releasably interconnected with the support post 110 by the spring clips 160 and 222. The spring clips used to interconnect the upper pallet 172 with the posts 110 are identical to the spring clips used to interconnect the lower pallet 20 with the post 110.

In a similar manner, the upper pallet 172 is releasably interconnected with the remaining support posts extending upwardly from the lower pallet 20. Thus, one or more spring clips 224 are used to releasably interconnect the right intermediate post 190 (FIG. 1) with the upper pallet 172. One or more identical spring clips 224 releasably interconnect the right rear support port 182 with the upper pallet 172. Identical spring clips 224 are also used to releasably interconnect the upper pallet 172 with the left rear support post 186, the left intermediate support post 210, and the left front support post 186.

All of the support posts 110, 190, 182, 186, 210, and 188 are identical with each other. Furthermore, all of the spring clips used to interconnect the support posts with the lower and upper pallets are identical to each other.

An optional wrapper 226 (FIG. 10) which is preferably a polyethylene shrink wrap or stretch wrap may be used to further secure the shipping stand 10. The wrapper 226 extends from a location underneath the lower pallet rim portion 72, upwardly alongside the support post 110 and the other support posts, over the upper rim portion 216 of the upper pallet 172, and inwardly therefrom. The wrapper 226 may be cut off thereat, or may extend across the entire top of the package 10. The wrapper also protects the article 12 from the weather and environment, and can be left on for display.

Multi-Pack Shipping Stand—Assembled Condition

The parts used to make the single pack shipping stand 10 can also be used to make a multi-pack shipping stand 250 (FIGS. 3 and 11) for transporting a plurality (two or three or more) of articles. The shipping stand 250 is assembled with a plurality of pallets identical to the pallets of the single-pack shipping stand 10; with a plurality of support posts identical to the support posts of the single-pack shipping stand 10; and with a plurality of spring clips identical to the spring clips of the single-pack shipping stand 10.

Figure 3:
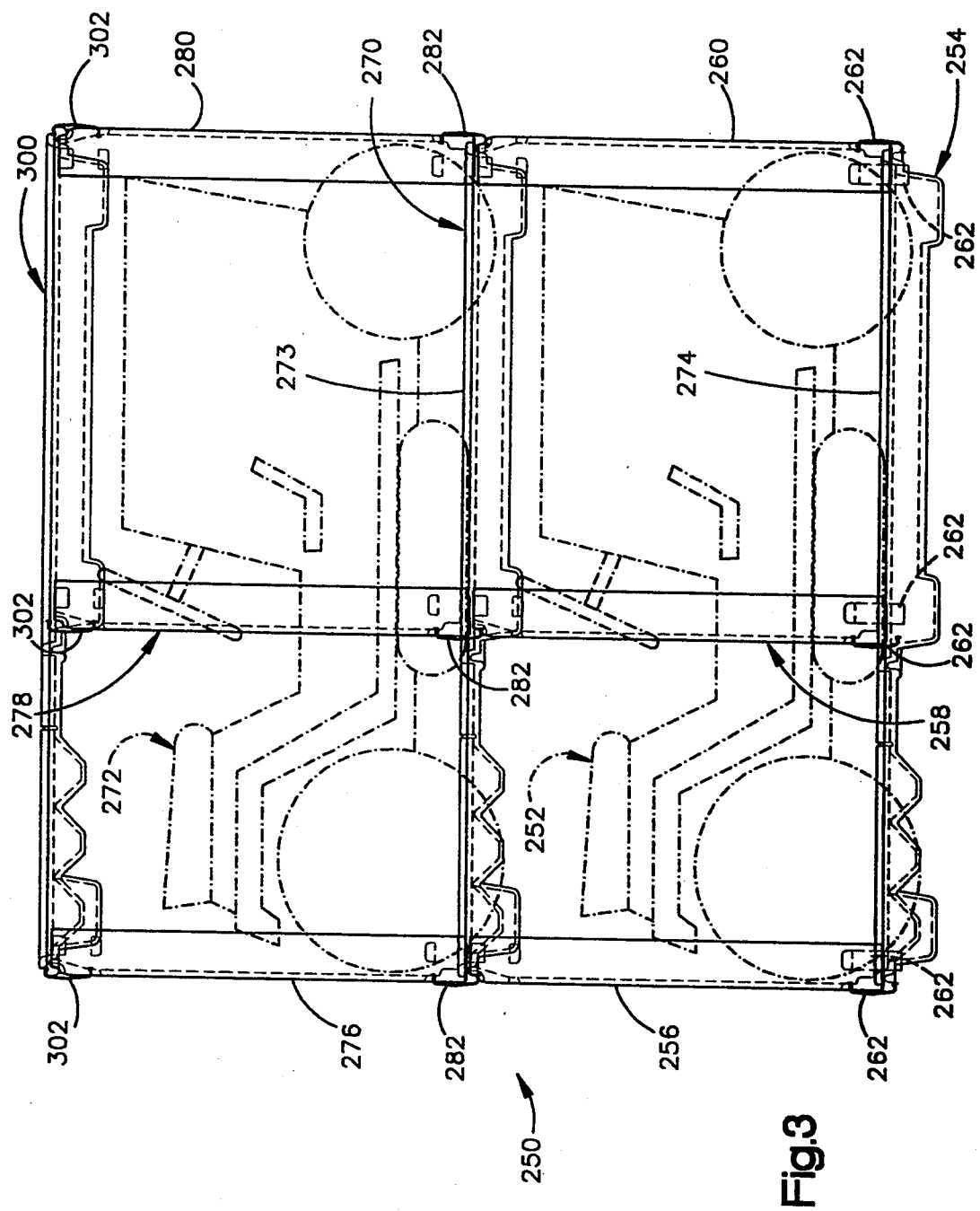
FIG. 3 illustrates a multi-pack of shipping stands of the type shown in FIG. 1.

In the multi-pack shipping stand 250, a first article 252 (FIG. 3) is disposed on a lower pallet 254. A plurality of lower support posts identical to the support post 110 are connected with the lower pallet 254. Three lower support posts 256, 258 and 260 are shown in FIG. 3.

Figure 11:
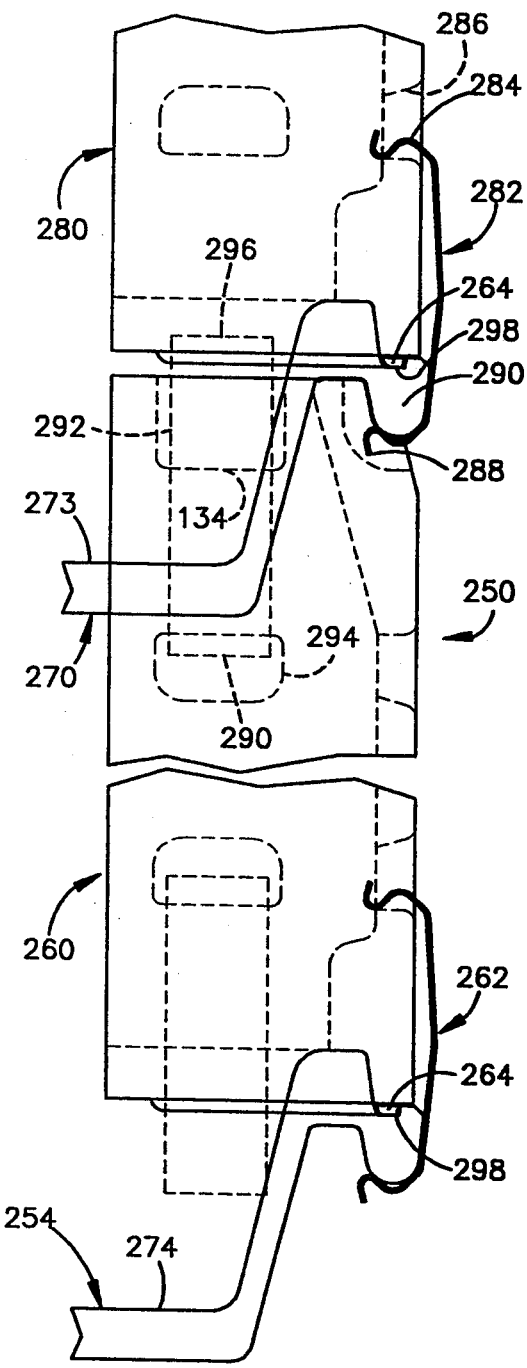
FIG. 11 is a view similar to FIG. 10 but showing the similar engagement for a multi-pack shipping stand.

A plurality of identical spring clips 262 interconnect the lower support posts 256–260 with the lower pallet 254 in the same manner as the spring clip 160 (FIG. 10) interconnects the pallet 20 and the post 110. As illustrated in FIGS. 3 and 11, a pair of spring clips 262 interconnect the lower support post 256 with the lower pallet 254. A pair of spring clips 262 interconnect the lower support post 258 with the lower pallet 254. A pair of spring clips 262 interconnect the lower support post 260 with the lower pallet 254. The other lower support posts (not shown) are similarly interconnected with the lower pallet 254. A rib 264 on the post 260 engages in a channel 266 in the pallet 254, just as the rib 144 (FIG. 10) in the post 110 engages in the channel 174 in the pallet 20.

An intermediate pallet 270 is disposed atop and interfits with the lower support posts of the shipping stand 250 in the same manner as the pallet 172 (FIG. 10) is disposed atop and interfits with the support post 110. A second article 272 (FIG. 3) which may be identical to the first article 252 is disposed atop the intermediate pallet 270. The intermediate pallet 270 is oriented the same as the lower pallet 254, each with an upwardly facing major side surface 273, 274, respectively, for receiving its respective article 272, 252.

A plurality of upper support posts identical to the lower support posts are connected with the intermediate pallet 270. Preferably, the number of upper support posts used is the same as the number of lower support posts used. Three upper support posts 276, 278 and 280 are shown in FIG. 3. The upper support posts all rest on and interfit with the intermediate pallet 270 in the same manner that the lower support posts rest on and interfit with the lower pallet 254. A rib 264 on the upper post 280 (FIG. 11) engages in a channel 298 on the intermediate pallet 270, just as the rib 264 on the lower support post 260 engages in the channel 266 on the lower pallet 254.

A plurality of spring clips 282 interconnect the intermediate pallet 270 and the upper support posts 276–280. Specifically, an exemplary spring clip 282 (FIG. 11) extends between the upper support post 280 and the intermediate pallet 270. An upper end portion 284 of the spring clip 282 extends through and engages in a spring clip receiving opening 286 in the upper support post 280. A lower end portion 288 of the spring clip 282 extends underneath and engages against a lower rim portion 290 of the intermediate pallet 270. The other spring clips 282 (FIG. 3) used to interconnect the upper support posts and the intermediate pallet 270 are fitted in a similar manner.

Additional spring clips may be used to interconnect the lower support posts with the intermediate pallet 270. As seen in phantom in FIG. 11, a lower end portion 290 of a spring clip 292 engages in an opening 294 in the support post 260. An upper end portion 296 of the spring clip 292 engages in the channel 298 in the intermediate pallet 270. Such additional spring clips are not normally needed, as the interlocking fit between the posts and the pallets makes the package stable enough in its assembled condition without such additional clips.

An upper pallet 300 (FIG. 3) is disposed atop and interfits with the upper support posts of the multi-pack shipping stand 250 in the same manner as the intermediate pallet 270 is disposed atop and interfits with the lower support posts of the shipping stand 250. A plurality of spring clips 302 interconnect the upper pallet 300 and the upper support posts in the same manner as the spring clip 162 (FIG. 10) interconnects the pallet 172 and the post 110. As illustrated in FIGS. 3 and 11, a spring clip 302 interconnects the upper support post 276 with the upper pallet 300. A spring clip 302 interconnects the upper support post 278 with the upper pallet 300. A spring clip 302 interconnects the upper support post 280 with the upper pallet 300. The other upper support posts (not shown) are similarly interconnected with the upper pallet 300.

All the spring clips of the present invention are easily manually releasable with the aid of simple hand tools. A wrapper such as the wrapper 226 (FIG. 10) for the shipping stand 10 may be used with the multi-pack shipping stand 250 also. Alternatively, standard bands or straps can be used.

Disassembled Condition—Returnable and Reusable

When a shipping stand of the present invention is in the disassembled condition, the support posts can be stored in the pallets. Thus, the shipping stands are returnable and are reusable by the shipper.

Figure 5:
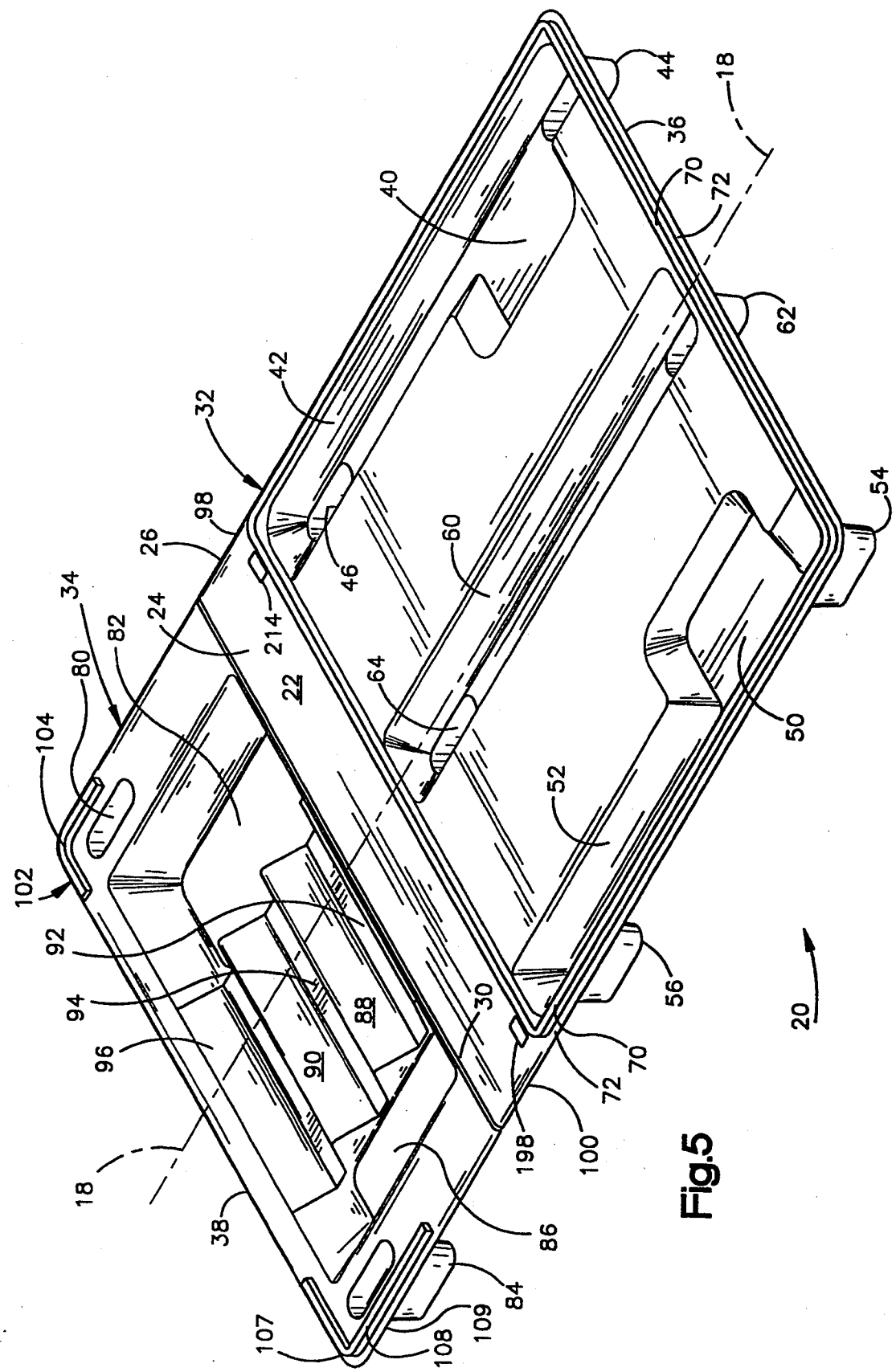
FIG. 5 is a right front perspective view of a pallet of a shipping stand of FIG. 1.

Specifically, if four support posts are used to form a shipping stand 10, three of the support posts are stored in the transversely extending rear storage channels 92, 94 and 96 (FIGS. 5 and 6). The other support post is stored in the longitudinally extending storage central channel 60 (FIGS. 5 and 6). FIG. 8 shows in phantom three support posts 312, 314 and 316 stored in the rear storage channels 92, 94 and 96 and FIG. 7 shows one support post 318 stored in the central storage channel 60. The left and right storage channels 42 and 52, respectively, would be open as there would be no article portions such as vehicle wheels in the front wheel wells 40 and 50 of the pallet 20.

If six support posts are used to form a shipping stand 10, the other two support posts are stored in the longitudinally extending side storage channels 42 and 52. All stored posts are received on a pallet in an orientation generally parallel to the upper major side surface of the pallet.

After the support posts are placed in the storage channels in the lower pallet 20, the upper pallet 172 is placed over the support posts and closely spaced from the lower pallet, as illustrated in FIG. 9. The upper pallet 172 clamps the support posts against the lower pallet 20. Thus, the support posts are secured in between the upper and lower pallets for return shipment. (Of course, as the lower pallet 20 and the upper pallet 172 are identical, they may be reversed or switched.) Suitable banding or strapping may be used to secure the shipping stand in its disassembled condition for return shipment and storage. The total vertical height of two pallets with support posts between is as little as 1/20 of the height of the assembled package 10.

The shipping stand is easily reused by simply separating the component parts for reassembly. This process is facilitated by the fact that the support posts are stored with the pallets.

FIG. 9 also illustrates that the lower pallet 20 and the identical upper pallet 172 are nestable. If two or more pallets such as the pallet 20 are to be stored together without support posts, the pallets are placed on top of each other and nest so that their combined vertical height is less than the total of their individual heights. The forks of a fork lift are still able to be inserted between adjacent pallets to separate them.

Also, because in any shipping stand of the present invention the upper and lower pallets are identical, the pallets (and thus the shipping stands) are stackable. Two completed shipping stands may be placed one atop another. The lower pallet of the upper shipping stand interfits and interlocks with the upper pallet of the lower shipping stands for stability. Accordingly, if it is not desired to use one single pallet as both the upper pallet of one shipping stand and the lower pallet of another shipping stand, then two single pack shipping stands, each having two pallets, can simply be stacked one atop the other.

Steel Posts—Single Pack

Figure 2:
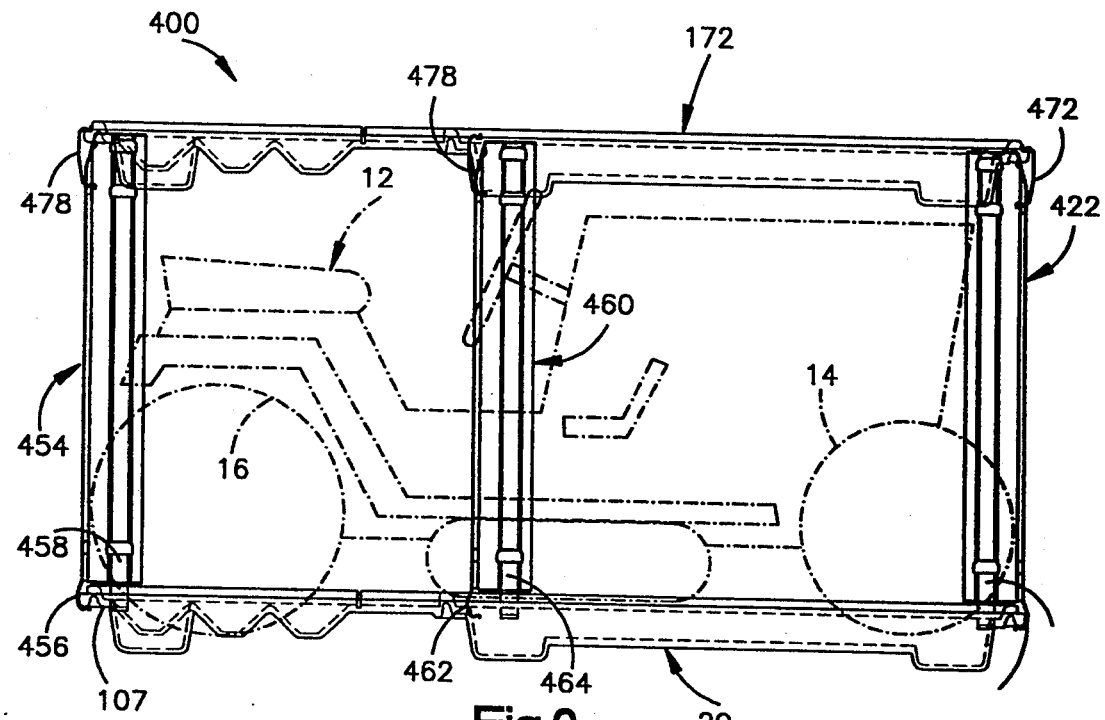
FIG. 2 is a view similar to FIG. 1 but showing support posts made of steel.

FIGS. 2, 4 and 13–18 illustrate shipping stands having support posts made of metal rather than of molded wood products. FIG. 2 illustrates a single pack shipping stand 400. The shipping stand 400 is adapted to receive and transport an article such as the garden tractor 12 having front wheels 14 and rear wheels 16. The shipping stand 400 includes a generally rectangular lower pallet 20. The lower pallet 20 is identical to or the same piece as the pallets 20, 172 and 300 described above.

The shipping stand 400 includes a plurality of identical metal support posts which, when the shipping stand 400 is in the assembled condition shown in FIG. 2, extend upwardly from the lower pallet 20. Either four or six support posts may be used. Since all the support posts are identical, the right front support post 422 will be described as exemplary. The metal posts are preferably stamped steel.

Figure 18:
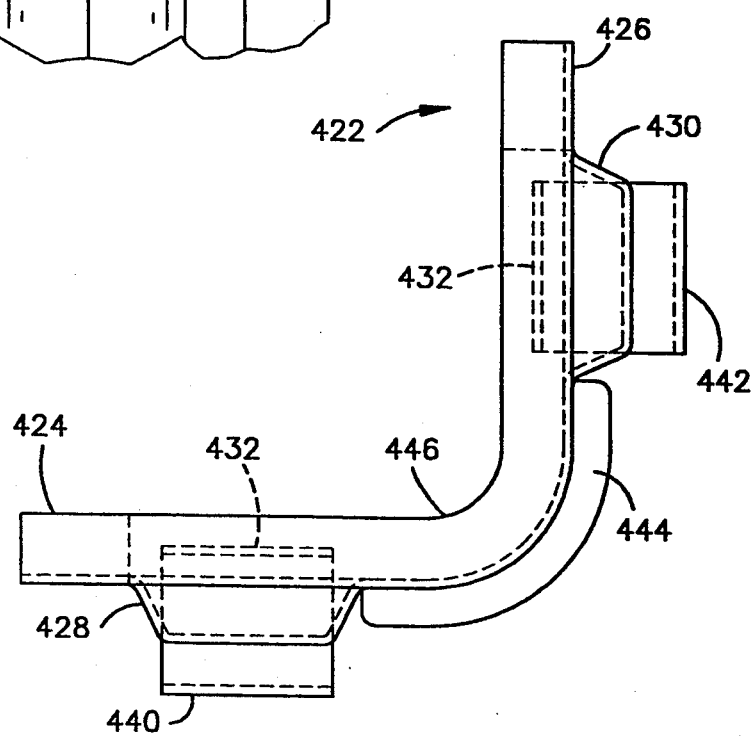
FIG. 18 is a top plan view of a steel support post.

The support post 422 is generally L-shaped in cross-sectional configuration as best seen in FIGS. 13 and 18. The post 422 includes two vertically extending walls 424 and 426 disposed at right angles to each other. The wall 424 has an outwardly projecting portion 428. The wall 426 has an outwardly projecting portion 430.

Two spring clip receiving openings extend through the wall portions 428 and 430 of the post 422. A spring clip receiving opening 432 in the wall portion 428 is disposed at the same vertical height along the post 422 as a spring clip receiving opening 434 in the wall portion 430, near the upper end of the post 422. The clips 440 and 442 may be formed as one piece with the post 422, or may be welded or riveted on.

The post 422 includes two integrally attached spring clips 440 and 442 which extend downwardly from the side wall portions 428 and 430, respectively. At its lower end the post 422 (FIG. 15A) has an L-shaped inwardly extending flange 444 and an L-shaped outwardly extending flange 446.

The shipping stand 400 also includes an upper pallet, such as the upper pallet 172, releasably interconnected atop the several metal support posts, in a manner described below, by a plurality of spring clips identical to the spring clips 160 described above. The upper pallet 172 is identical to the lower pallet 20.

To form the shipping stand 400 in the assembled condition as shown in FIG. 2, the lower pallet 20 is placed on the ground around a similar support. The tractor or other article 12 is located on the lower pallet 20. The wheels 14 and 16 of the tractor 12 are disposed in wheel wells in the pallet 20.

A plurality of the identical metal support posts are then connected with the lower pallet 20 to extend upwardly from the lower pallet. At least four support posts are used, at the four outer corners of the pallet 20.

The right front support post 422 is positioned on the right front corner of the pallet 20 as shown in FIGS. 2 and 13–14. The inwardly extending L-shaped flange 444 of the post 422 rests on the L-shaped upper rim portion 70 of the pallet 20. The outwardly extending L-shaped flange 446 on the bottom of the post 422 is received in the shallow L-shaped channel 174 at the top of the pallet outer rim portion 72. The post 422 and the pallet 20 thus interfit and interlock with each other, with the L-shaped cross-sectional configuration of the post 422 blocking movement of the post inwardly of the pallet either axially or transversely.

The spring clips 440 and 442 also are connected between the post 422 and the lower pallet 20. A lower end portion 452 of the spring clip 442 engages underneath the pallet outer rim portion 72. The second spring clip 440 (shown in phantom in FIG. 14) is connected between the post wall 424 and the lower pallet 20, its lower end portion engaging underneath the outer rim portion 72 of the pallet 20. Thus, the spring clips 440 and 442 of the post 422 releasably interconnect the post and the lower pallet 20.

Support posts identical to the support posts 422 are also placed at the three other corners of the lower pallet 20 for connection therewith to extend vertically upward from the lower pallet 20. A right rear support post 454 extends upwardly from the right rear corner of the lower pallet 20. The right rear support post 454 is releasably connected with the right rear corner rim portion 107 of the pallet 20 by two spring clips 456 and 458 on the post 454, in the same manner as the support post 422. Similarly, support posts are positioned on the left rear and left front corners of the lower pallet 20.

If desired, two additional intermediate support posts may be used. A right intermediate support post 460 (FIG. 2) may be supported on the right corner portion 192 of the pallet front portion 432. Two spring clips 462 and 464 on the post 460 releasably interconnect the post 460 with the lower pallet 20. One spring clip 462 extends through the opening 198 (FIG. 5) in the lower pallet 20. The second spring clip 464 engages underneath the pallet outer rim portion 72. In a similar manner, a left intermediate post (not shown) may be positioned at the left rear corner 212 of the pallet front portion 32.

The upper pallet 172 is then connected with the support post including the support post 422. The upper pallet rim portion 216 rests on the upper ends of the post walls 424 and 426. The upper end portion 470 of a spring clip 472 (which is identical to the spring clip described above) engages in the shallow channel 220 in the pallet lower rim portion 218. The lower end portion 474 of the spring clip 472 extends through and engages in the spring clip receiving opening 434 at the upper portion of the post 422. A second spring clip shown in phantom at 476 may be used to interconnect the upper pallet 172 through the spring clip receiving opening 432 in the post wall 424 of the support post 422.

Thus, the upper pallet 172 is releasably interconnected with the support post 422 by the spring clips 472 and 476. In a similar manner, the upper pallet 172 is releasably interconnected by additional spring clips 478 with the remaining metal support posts 454 and 456 extending upwardly from the lower pallet 20. An optional wrapper, like the wrapper 226 (FIG. 10) may be used to further secure the shipping stand 10.

All of the metal support posts are identical with each other. Furthermore, all of the spring clips used to interconnect the metal support posts with pallets disposed above them are identical to each other.

Multi-Pack Shipping Stand—Steel Posts

The set of parts used to make the single pack shipping stand 400 can also be used to make a multi-pack shipping stand 500 (FIGS. 4 and 15–16) for transporting a plurality of articles. The shipping stand 500 is assembled with a plurality of pallets identical to the pallets 20 and 172 of the single pack shipping stands 10 and 400. The shipping stand 500 includes a plurality of metal support posts identical to the metal support posts of the single pack shipping stand 400; and a plurality of spring clips identical to the spring clips 160 and 472 of the single pack shipping stands 10 and 400.

In the multi-pack shipping stand 500, a first article 252 is disposed on a lower pallet 254. A plurality of lower support posts identical to the support posts 422 are connected with the lower pallet 254. Three lower supports posts 506, 508 and 510 are shown in FIG. 3. A plurality of identical spring clips 512 on the lower support posts 506, 508 and 510 interconnect the lower support post with the lower pallet 254, in the same manner as described above with reference to the interconnection between the support post 422 and the pallet 20.

An intermediate pallet 270 is disposed atop and interfits with the lower support posts 506–510 of the shipping stand 500, in the same manner as the pallet 172 is disposed atop and interfits with the support 422 (FIG. 14). A second article 272 which may be identical to the first article 252 is disposed atop the intermediate pallet 270. The intermediate pallet 270 is oriented in the same direction as the lower pallet 254, each with an upwardly facing major side surface 273, 274, respectively, for receiving its respective article 272, 252.

Figure 4:
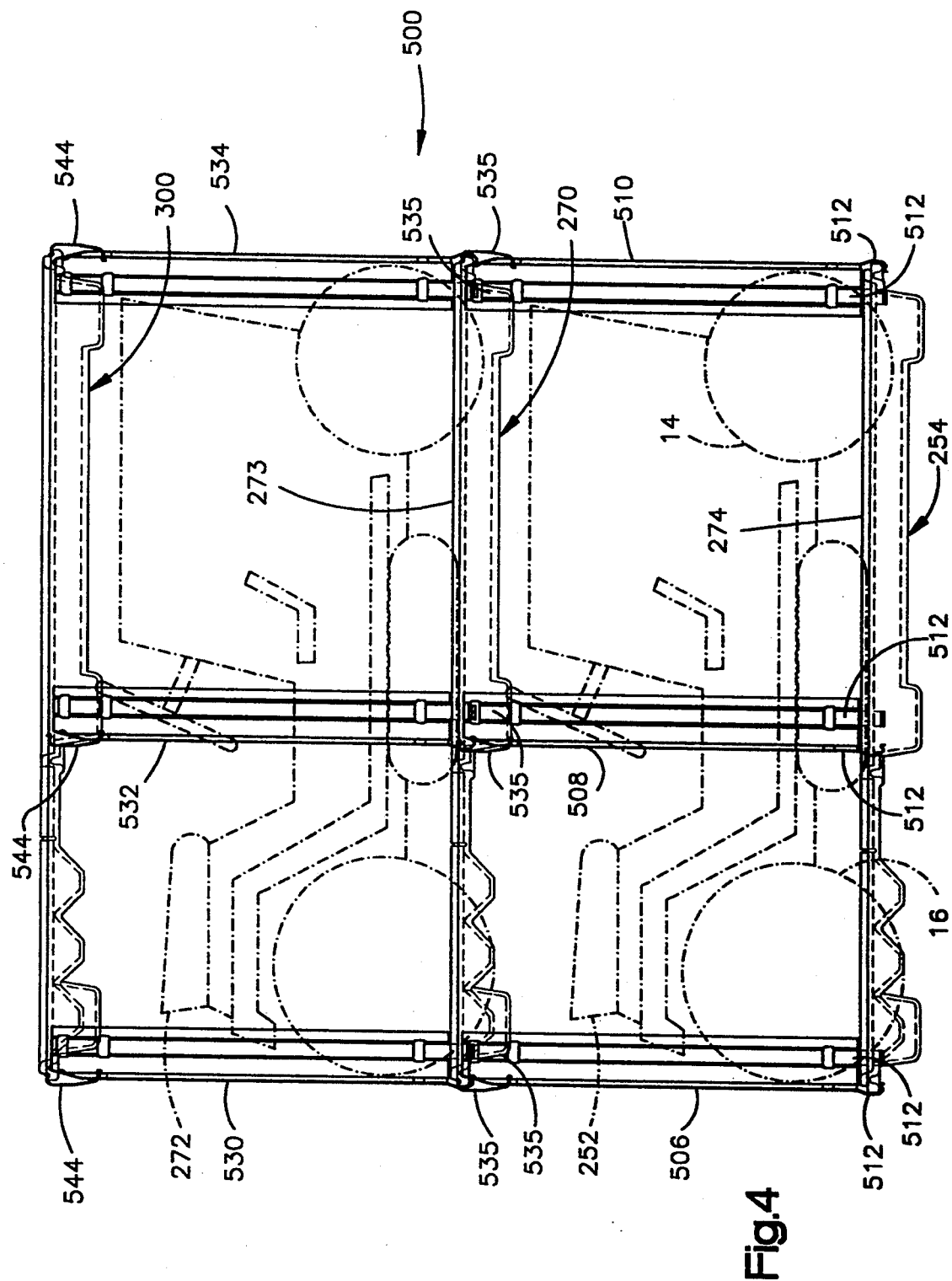
FIG. 4 illustrates a multi-pack of shipping stands of the type illustrated in FIG. 2.

A plurality of upper support posts identical to the lower support posts 506–510 are connected with the intermediate pallet 270. Preferably, the number of upper support posts used is the same as the number of lower support post used. Three upper support posts 530, 532 and 534 are shown in FIG. 4. The upper support posts 530–534 all rest on and interfit with the intermediate pallet 270, in the same manner that the lower support posts 506–510 rest on and interfit with the lower pallet 20. A plurality of spring clips 535 at the lower ends of the upper support posts 530–534 interconnect the upper support posts with the intermediate pallet 270.

Figure 16:
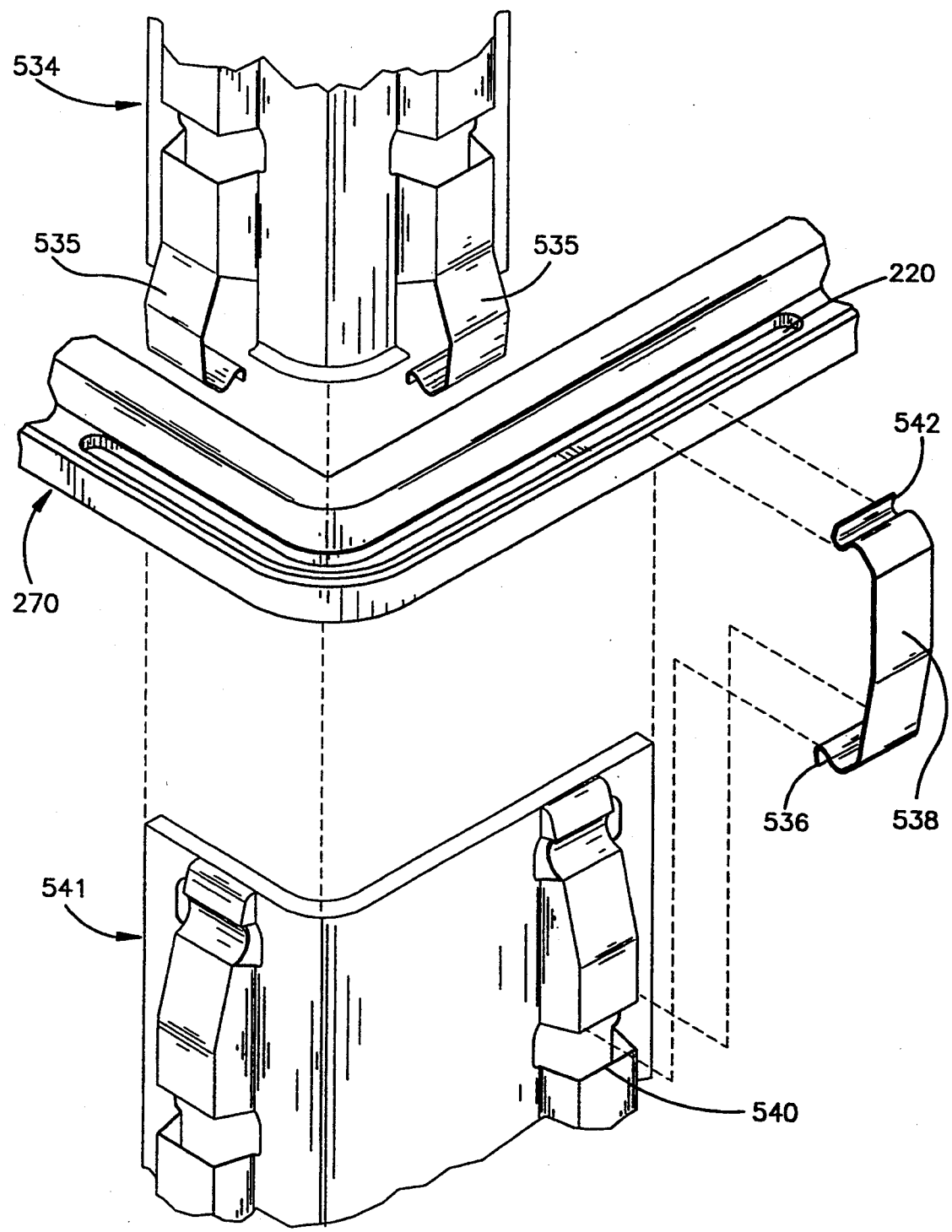
FIG. 16 is an exploded perspective view illustrating an optional assembly process of a multi-pack shipping stand with steel support posts.
Figure 17:
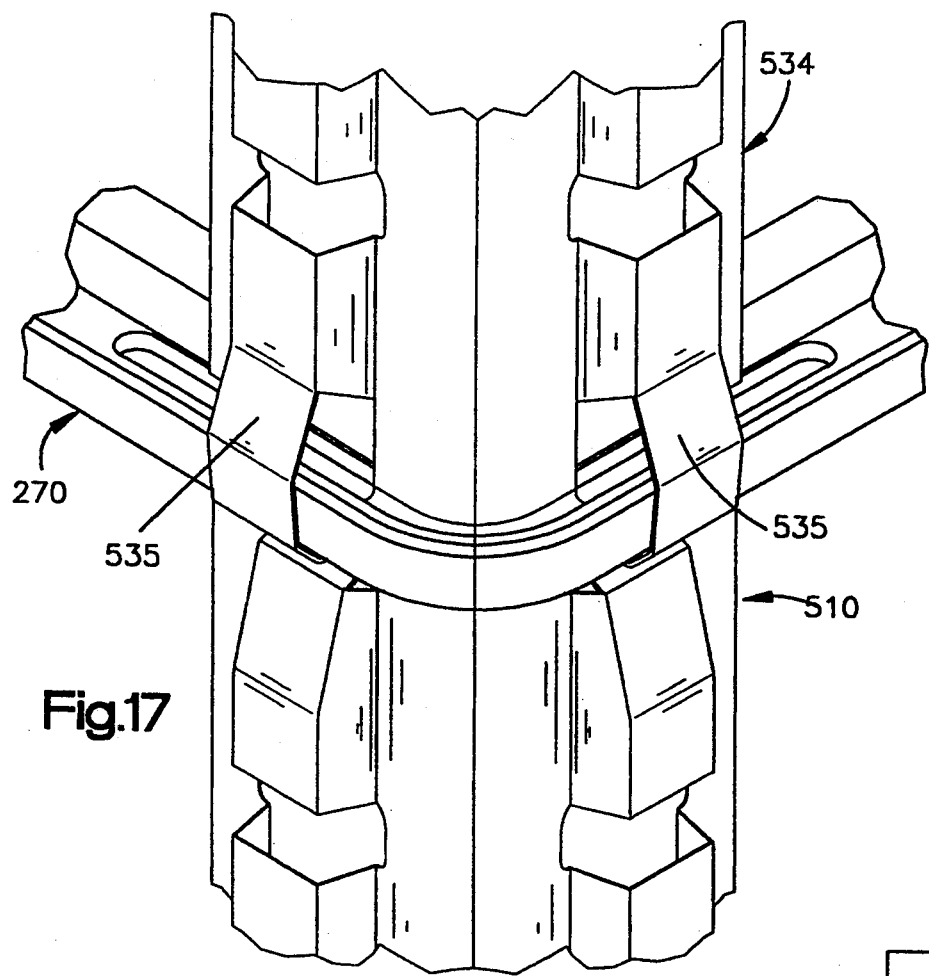
FIG. 17 is an enlarged view of a portion of FIG. 13.

Additional spring clips may be used to interconnect the lower support posts 506–510 and the intermediate pallet 270. If this is desired, the upper portions of one or more of the lower support posts 506–510 are widened (FIG. 16) along one or more side walls to accept the spring clips. This is necessary to avoid interference with the spring clips extending downward from the upper support posts. As seen in FIG. 16, a lower end portion 536 of a spring clip 538 engages in an opening 540 in the support post 541. The upper end portion 542 of the spring clip 538 engages in the channel 220 in the intermediate pallet 270.

An upper pallet 300 is disposed atop and interfits with the upper support posts 530–534 of the multi-pack shipping stand 500, in the same manner as the intermediate pallet 270 is disposed atop and interfits with the lower support posts 506–510. A plurality of spring clips 544 interconnect the upper pallet 300 and the upper support posts 530–534 in the same manner as the spring clips 538 (FIG. 16) interconnects the intermediate pallet 172 and the post 539. The spring clips 544 are identical to the others described above and are all easily manually engageable and releasable with the aid of simple hand tools. A wrapper such as the wrapper 226 (FIG. 10) may be used with the multi-pack shipping stand 500 also. Alternatively, standard bands or straps may be used.

When a shipping stand 400 or 500 of the present invention is in the disassembled condition, the metal support posts can be stored in the pallets in the same manner as the molded wood posts are stored. Thus, the shipping stands 400, 500 are returnable and reusable.

Materials—Recyclable

All of the parts of the shipping stands of the present invention are recyclable. That is, each part is made of a single homogeneous material; and each part does not have parts or sections of a different material fixedly connected therewith; and each part does not have components which need to be separated prior to recycling.

Thus, the spring clips (all identical to each other) which releasably interconnect the pallets and the support posts are made of spring steel. Each spring clip is made of a single homogeneous piece of spring steel and does not have parts or sections of a different material fixedly connected therewith. The spring clips are free of a fixed attachment to any other parts. The spring clips permanently connected at the lower ends of the steel support post are attached thereto by riveting or welding or are formed as one piece with the post. They are of the same material as the posts themselves.

The pallets (all identical to each other) are preferably made of wood products molded to shape, i.e., a known mixture of wood fibers and synthetic resins. Each pallet is a single homogeneous piece molded of wood material and does not have parts or sections of a different material fixedly connected therewith. The pallets are free of a fixed attachment to any other parts. The pallets may be made of any other suitable material. Molded wood is chosen for its strength, its ability to be formed into a suitable shape, and one-piece construction requiring no fasteners or inserts. The pallets can also be made from molded plastic, for use for example in the food industry where wood is not allowed, or from formed (stamped) metal such as steel.

The support posts (all identical to each other) are preferably made of the same molded wood products as the pallets. Each support post is a single homogeneous piece molded of wood material and does not have parts or sections of a different material fixedly connected therewith. The support posts are free of a fixed attachment to any other parts. The interlocking fit between the posts and the pallets makes it unnecessary to provide connectors between them other than the releasable spring clips.

The optional wrapper is made of a single piece of plastic suitable for shrink wrapping or stretch wrapping. The wrapper is made of a single homogeneous material and does not have parts or sections of a different material fixedly connected therewith. The wrapper is free of a fixed attachment to any other parts.

Therefore, all of the parts of the shipping stands of the present invention are recyclable; that is, the shipping stands are constructed entirely from recyclable components. Because of this, when one or more parts of a shipping stand of the present invention is to be recycled, no additional steps such as material separation or parts removal is necessary. The wood pallets and support posts, for example, can be placed directly in a grinder.

A further advantage of the present invention is that each of the pallets is reusable to form a standard size pallet for receiving thereon a different size and type of article smaller than a garden tractor. The lower pallet 20 includes a score line 30 dividing the lower platform into first and second platform portions 32 and 34. The front portion 32 (FIG. 5) of the lower pallet 20 includes first support means for supporting the lower platform on a floor surface, that is, the feet 44, 46, 54, 56, 62, and 64; and the second platform portion 34 includes second support means for supporting the lower platform on a floor surface, that is, the feet 80 and 84. The first (front) platform portion 32 is of a standard pallet size such as 42"×42", 48"×42", or 48"×40". The overall size of the pallet 20 may be about 72" by 42".

When the lower platform 20 is separated at the score line 30, the front portion 32 forms a standard size pallet which is self-supporting off the ground. This pallet is reusable for receiving thereon a different size and type of article smaller than a garden tractor (or the original article). This is desirable when, for example, the packaging of the present invention is shipped a log distance and the consignee does not wish to return the packaging or to reuse it for the same article. Such a standard size pallet can be used, for example by a company receiving a garden tractor, to store or transport mulch, fertilizer, etc.

The lower platform is large and strong enough to support a garden tractor. Its thickness is ⅜" to ¾" depending on location. A typical garden tractor weighs 400# to 1,000#. Each pallet holds 1,000# to 2,500#. Each pallet supports the weight of all the articles, pallets, support posts, etc. above it. The support posts are tall enough, about 30", to support the upper platform at a level above the article when the article is a garden tractor. The support posts are strong enough as a group to support the article when the article is a garden tractor.

As discussed above, it is possible to set single pack shipping stands on top of each other. The multi-pack shipping stands are used to save packaging room (less height) and weight (fewer pallets). Multi-packs of three articles high are typically shipped as truck load height. Multi-packs typically are stacked in a warehouse at twice truckload height, or six articles high.

From the foregoing description of the invention, those skilled in the art will perceive improvements, changes and modifications in the invention. Such improvements, changes and modifications within the skill of the art are intended to be covered by the appended claims.

We claim:

1. A returnable package for an article, comprising:

a horizontally extending lower pallet which serves as the bottom of said package, said lower pallet having an upper major side surface and having a lower major side surface, said upper major side surface of said lower pallet having surface means for receiving thereon a said article;

an upper pallet which serves as the top of said package, said upper pallet being substantially identical to said lower pallet, said upper pallet having an upper major side surface which is substantially identical to said upper major side surface of said lower pallet, said upper pallet having a lower major side surface which is substantially identical to said lower major side surface of said lower pallet;

said upper major side surface of said lower pallet facing upward in a first direction, said lower major side surface of said upper pallet facing downward in a second direction opposite to said first direction, said lower major side surface of said upper pallet being presented toward said upper major side surface of said lower pallet;

a plurality of elongate load-bearing support posts extending between said lower pallet and said upper pallet in a direction generally perpendicular to said upper major side surface of said lower pallet, each one of said plurality of support posts having a lower end portion engaging said lower pallet and an upper end portion engaging said upper pallet, said plurality of support posts supporting said upper pallet on said lower pallet at a location spaced upward from said lower pallet to at least partially define an article-receiving chamber between said upper pallet and said lower pallet; and a plurality of connector members releasably interconnecting said support posts with said upper pallet and with said lower pallet;

wherein said upper pallet is movable from said location spaced upward from said lower pallet to a nested position disposed in closely spaced relation to and nested with said lower pallet, a portion of said upper major side surface of said lower pallet engaging a portion of said lower major side surface of said upper pallet when said pallets are nested, said lower pallet including surface means configured the same as said support posts for defining a plurality of storage spaces for receiving said support posts in a storage orientation extending generally parallel to said upper major side surface of said lower pallet, each one of said support posts having an elongate central portion with side surfaces extending between said end portions of said one support post, said side surfaces of said elongate central portions of said support posts engaging said lower major side surface of said upper pallet and engaging said upper major side surface of said lower pallet when said support posts are in said storage orientation.

2. A package as set forth in claim 1 wherein the combined vertical height of said upper and lower pallets when nested is less than the total of their individual heights and said pallets when thus nested have respective portions which are separated from each other and which define between them space for receiving the forks of a fork lift.

3. A returnable package for an article comprising:

a horizontally extending lower pallet which serves as the bottom of said package, said lower pallet having an upper major side surface and having a lower major side surface, said upper major side surface of said lower pallet having surface means for receiving thereon a said article;

an upper pallet which serves as the top of said package, said upper pallet being substantially identical to said lower pallet, said upper pallet having an upper major side surface which is substantially identical to said upper major side surface of said lower pallet, said upper pallet having a lower major side surface which is substantially identical to said lower major side surface of said lower pallet;

said upper major side surface of said lower pallet facing upward in a first direction, said lower major side surface of said upper pallet facing downward in a second direction opposite to said first direction, said lower major side surface of said upper pallet being presented toward said upper major side surface of said lower pallet;

a plurality of elongate load-bearing support posts extending between said lower pallet and said upper pallet in a direction generally perpendicular to said upper major side surface of said lower pallet, each one of said plurality of support posts having a lower end portion engaging said lower pallet and an upper end portion engaging said upper pallet, said plurality of support posts supporting said upper pallet on said lower pallet at a location spaced upward from said lower pallet to at least partially define an article-receiving chamber between said upper pallet and said lower pallet; and a plurality of connector members releasably interconnecting said support posts with said upper pallet and with said lower pallet; wherein said lower pallet includes six feet for supporting said lower pallet on a floor surface, said lower pallet having a score line dividing said lower pallet into first and second pallet portions, said first pallet portion having four of said six feet and said second pallet portion having the remaining two of said six feet, said first pallet portion being of a standard pallet size whereby said lower pallet can be separated at said score line for forming a standard size pallet comprising said first pallet portion including said four of said six feet.

4. A returnable package for an article, comprising:
a horizontally extending lower pallet which serves as the bottom of said package, said lower pallet having an upper major side surface and having a lower major side surface, said upper major side surface of said lower pallet having surface means for receiving thereon a said article;
an upper pallet which serves as the top of said package, said upper pallet being substantially identical to said lower pallet, said upper pallet having an upper major side surface which is substantially identical to said upper major side surface of said lower pallet, said upper pallet having a lower major side surface which is substantially identical to said lower major side surface of said lower pallet;
said upper major side surface of said lower pallet facing upward in a first direction, said lower major side surface of said upper pallet facing downward in a second direction opposite to said first direction, said lower major side surface of said upper pallet being presented toward said upper major side surface of said lower pallet;
a plurality of elongate load-bearing support posts extending between said lower pallet and said upper pallet in a direction generally perpendicular to said upper major side surface of said lower pallet, each one of said plurality of support posts having a lower end portion engaging said lower pallet and an upper end portion engaging said upper pallet, said plurality of support posts supporting said upper pallet on said lower pallet at a location spaced upward from said lower pallet to at least partially define an article-receiving chamber between said upper pallet and said lower pallet; and
a plurality of connector members releasably interconnecting said support posts with said upper pallet and with said lower pallet;
wherein said lower pallet includes first and second support means for supporting said lower pallet on a floor surface and said lower pallet has a score line dividing said lower pallet into first and second pallet portions, said first pallet portion of said lower pallet having said first support means and said second pallet portion of said lower pallet having said second support means, said first pallet portion being of a standard pallet size, said lower pallet being separable at said score line to form a standard size pallet comprising said first pallet portion.

5. A returnable package for an article, comprising:
a horizontally extending lower pallet which serves as the bottom of said package, said lower pallet having an upper major side surface and having a lower major side surface, said upper major side surface of said lower pallet having surface means for receiving thereon a said article;
an upper pallet which serves as the top of said package, said upper pallet being substantially identical to said lower pallet, said upper pallet having an upper major side surface which is substantially identical to said upper major side surface of said lower pallet, said upper pallet having a lower major side surface which is substantially identical to said lower major side surface of said lower pallet;
said upper major side surface of said lower pallet facing upward in a first direction, said lower major side surface of said upper pallet facing downward in a second direction opposite to said first direction, said lower major side surface of said upper pallet being presented toward said upper major side surface of said lower pallet;
a plurality of elongate load-bearing support posts extending between said lower pallet and said upper pallet in a direction generally perpendicular to said upper major side surface of said lower pallet, each one of said plurality of support posts having a lower end portion engaging said lower pallet and an upper end portion engaging said upper pallet, said plurality of support posts supporting said upper pallet on said lower pallet at a location spaced upward from said lower pallet to at least partially define an article-receiving chamber between said upper pallet and said lower pallet; and
a plurality of connector members releasably interconnecting said support posts with said upper pallet and with said lower pallet;
wherein each one of said lower pallet and said upper pallet and said plurality of support posts and said plurality of connector members is recyclable and is free of a fixed attachment to each other one of said lower pallet and said upper pallet and said plurality of support posts and said plurality of connector members, said package when disassembled including no components which require separation prior to recycling; and
wherein said lower pallet includes first and second support means for supporting said lower pallet on a floor surface and a score line dividing said lower pallet into first and second pallet portions, said first pallet portion having said first support means and said second pallet portion having said second support means, said first pallet portion being of a standard pallet size, said lower pallet being separable at said score line to form a standard size pallet comprising said first pallet portion.

6. A package comprising:
a lower pallet having an upper major side surface for receiving an article and a lower major side surface;
an upper pallet identical to said lower pallet and similarly oriented to said upper pallet, said upper pallet having an upper major side surface and a lower major side surface;
a plurality of load-bearing support posts supporting said upper pallet on said lower pallet at a location spaced upward from said lower pallet to at least partially define between said upper pallet and said lower pallet an article-receiving chamber; and
a plurality of connector members releasably interconnecting said support posts with said upper and lower pallets;
said package being disassemblable into a disassembled condition including no components which require separation prior to recycling;
wherein each one of said lower pallet and said upper pallet and said plurality of support posts and said plurality of connector members is recyclable and is free of a fixed attachment to each other one of said lower pallet and said upper pallet and said plurality of support posts and said plurality of connector members;

said upper and lower pallets being nestable, the combined vertical height of said upper and lower pallets when nested being less than the total of their individual heights and said upper and lower pallets when thus nested having respective portions which are separated from each other and which define between them space for receiving the forks of a fork lift;

said support posts being clampable between said upper and lower pallets when said upper and lower pallets are nested;

said lower pallet including surface means for defining a plurality of storage spaces for receiving said support posts in an orientation generally parallel to said upper major side surface of said lower pallet when said pallets are nested, said upper pallet being disposed in closely spaced relation to said lower pallet when said pallets are nested, said support posts being disposed intermediate said upper pallet and said lower pallet and being clamped therebetween when said pallets are nested.

7. A package as set forth in claim 6, said lower pallet including a plurality of support portions for supporting said lower pallet on a floor surface and a score line dividing said lower pallet into first and second pallet portions, said first pallet portion having a first group of said support portions and said second pallet portion having the remaining ones of said support portions, said first pallet portion being of a standard pallet size whereby said lower pallet can be separated at said score line for forming a standard size pallet comprising said first pallet portion.

8. A package as set forth in claim 6 wherein said pallets are made of molded wood products and said support posts are made of molded wood products and said connector members are spring clips made of spring steel.

9. A package as set forth in claim 6 further comprising a single intermediate pallet disposed intermediate said upper pallet and said lower pallet, said intermediate pallet being substantially identical to said upper pallet and to said lower pallet, said intermediate pallet being oriented substantially identical to said upper pallet and to said lower pallet and having a lower major side surface presented toward said upper major side surface of said lower pallet and having an upper major side surface presented toward said lower major side surface of said upper pallet, said intermediate pallet together with said upper pallet and said lower pallet defining in said article-receiving chamber an upper chamber portion and a lower chamber portion each for receiving an article, said single intermediate pallet forming the top of said lower chamber portion and forming the bottom of said upper chamber portion.

* * * * *